United States Patent [19]

Eddy et al.

[11] Patent Number: 5,222,787
[45] Date of Patent: Jun. 29, 1993

[54] ELECTRO-HYDRAULIC BRAKING SYSTEM

[75] Inventors: William C. Eddy, West Bloomfield; Kenneth S. Towers, Royal Oak, both of Mich.

[73] Assignee: Allied-Signal Inc., Morristown, N.J.

[21] Appl. No.: 616,149

[22] Filed: Nov. 20, 1990

[51] Int. Cl.[5] .............................. B60J 8/34
[52] U.S. Cl. .................... 303/10; 303/9.62; 303/113.5
[58] Field of Search ............ 303/113 R, 113 AP, D4, 303/D3, 9.62, 9.63, 9.69, 10, 11, 116 R, 116 SP, 100

[56] References Cited

U.S. PATENT DOCUMENTS

| | | | |
|---|---|---|---|
| 3,814,484 | 6/1974 | Matthews | 303/20 |
| 3,825,308 | 7/1974 | Kasselmann et al. | 303/D3 X |
| 4,632,467 | 12/1986 | Kircher et al. | 303/113 AP |
| 4,637,664 | 1/1987 | Arikawa | 303/111 |
| 4,674,804 | 6/1987 | Burgdorf et al. | 303/6.01 |
| 4,790,607 | 12/1989 | Atkins | 303/113 AP |
| 4,795,219 | 1/1989 | Brearley et al. | 303/9.69 |
| 4,805,105 | 2/1989 | Weiss et al. | 364/426.02 |
| 4,824,183 | 4/1989 | Uchida | 303/D3 X |
| 4,852,008 | 7/1989 | Sager | 364/426.01 |
| 4,890,890 | 1/1990 | Leiber | 303/113 AP |
| 4,943,123 | 7/1940 | Takeda et al. | 303/113 AP |
| 5,015,040 | 5/1991 | Lin | 303/113 AP |

Primary Examiner—Matthew C. Graham

[57] ABSTRACT

A braking system (8) comprising: a master cylinder (10); rear brakes (12a,b) communicated to the master cylinder (10); front brakes (14a,b) hydraulically isolated from the rear brakes; an isolation valve (16; 16') interposing the master cylinder (10) and the front brakes (14a,b) having a first state communicating the master cylinder to the front brakes and a second state isolating the master from the front brakes and connecting a pump (42) to the front brakes; a motor (44) for powering the pump (42); a reservoir (54) communicated to an inlet of the pump (42); a control unit (40) for causing front brake pressure to follow rear brake pressure comprising: a first pressure sensor (30) for generating a signal indicative of rear brake pressure; electric proportioning device (94) for generating a commanded front brake pressure signal ($P_C$); a second pressure sensor (32) for generating a signal of actual front brake pressure ($P_A$); a comparator (96) for comparing the command brake pressure signal to the actual brake pressure signal and for generating an error signal ($P_E$); a motor control circuit responsive to an error signal for activating the motor and for powering the pump (42).

14 Claims, 2 Drawing Sheets

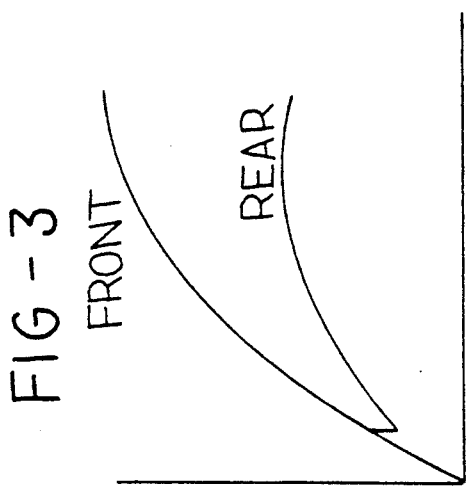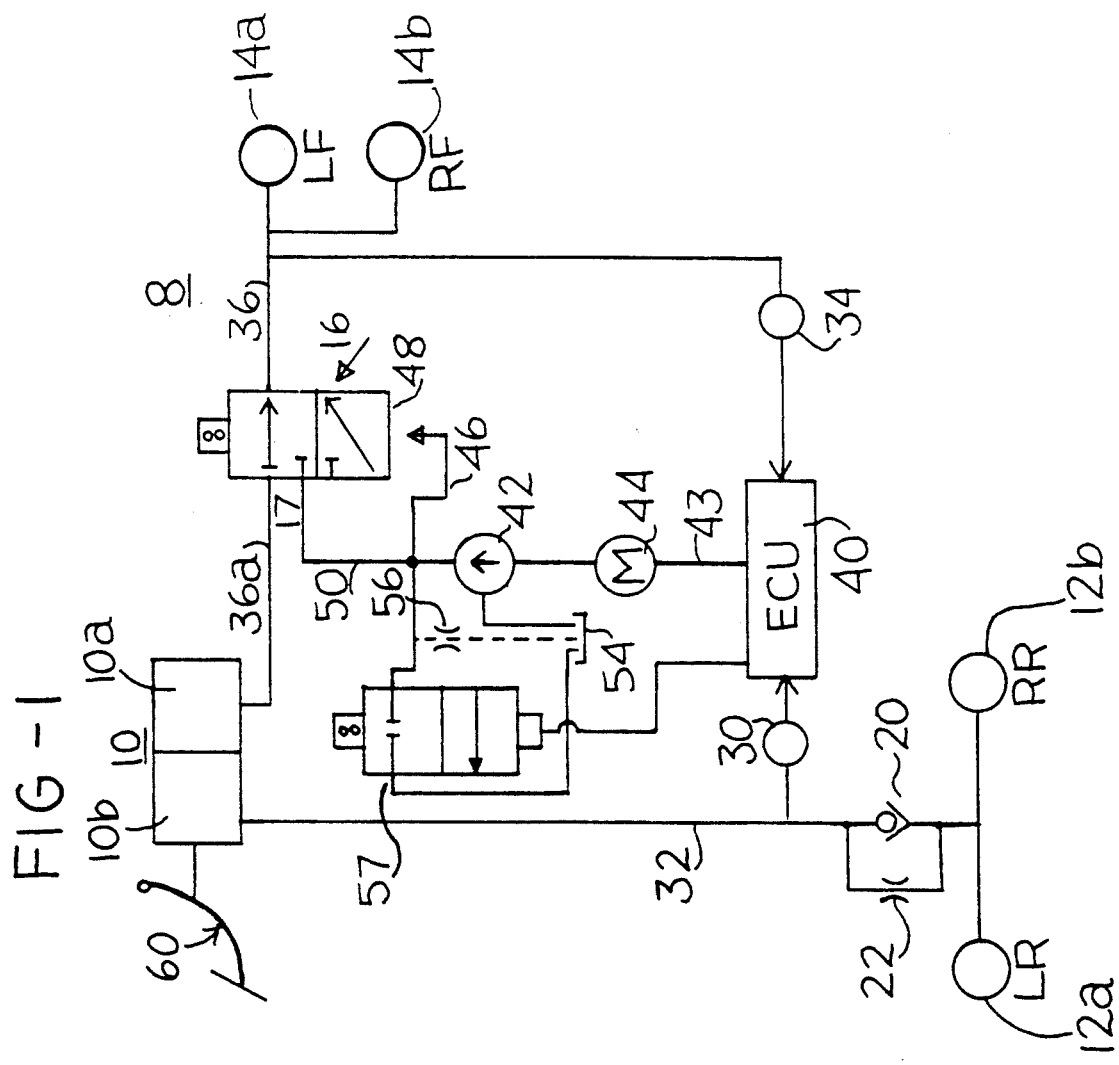

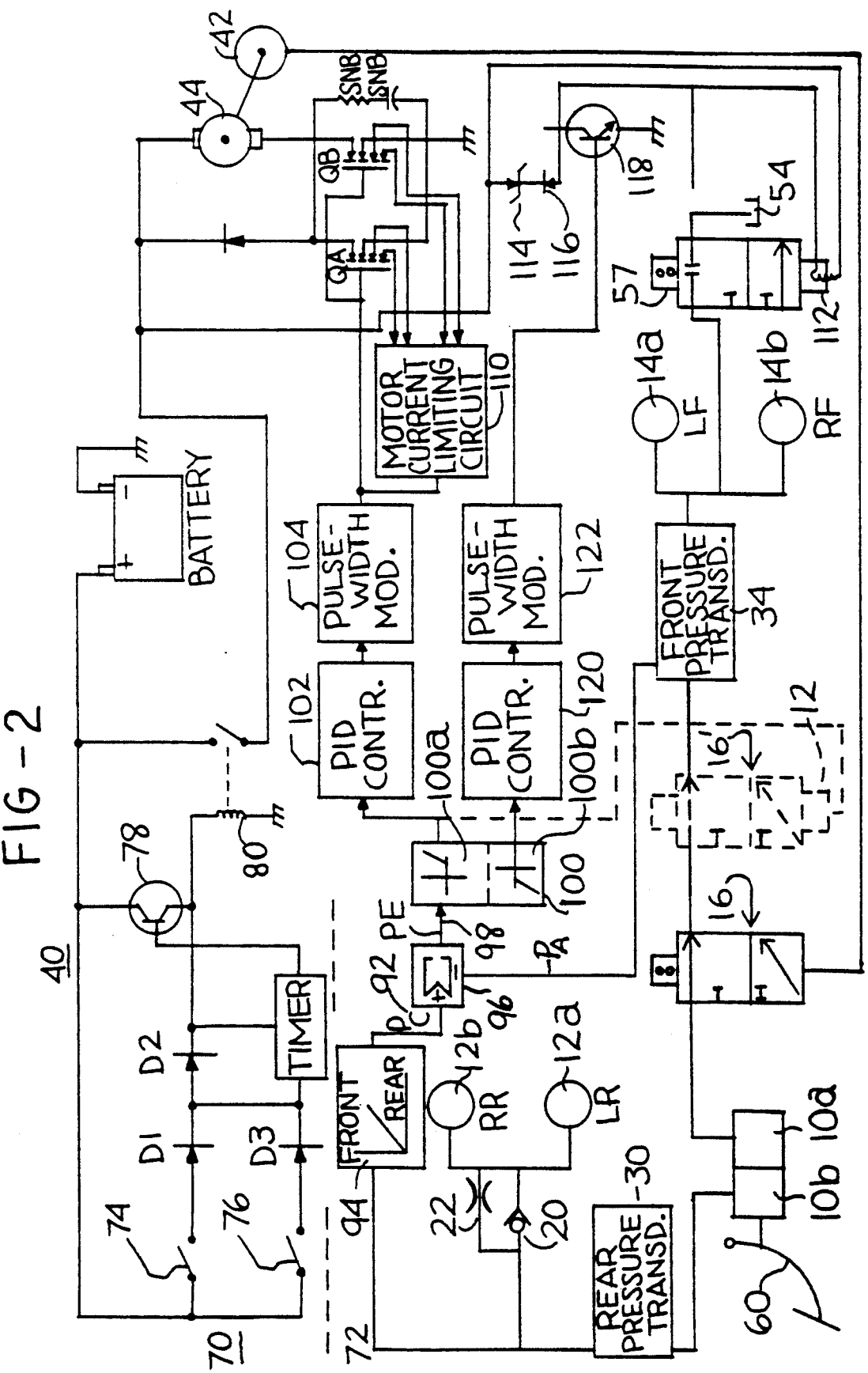

ELECTRO-HYDRAULIC BRAKING SYSTEM

BACKGROUND AND SUMMARY OF THE INVENTION

The present invention relates to a hydraulic braking system and more particularly to a multiple pressure input braking system where the front brakes are pressure referenced to the rear brakes.

The present invention is directed to a novel braking system in which the front brake pressure is alternatively controlled by master cylinder pressure or referenced to the rear brake pressure and generated by an electrically controlled pump. In this system the rear brake pressure is used as the control signal for the front brakes.

It is the object of the present invention to provide a hybrid type of brake actuation system wherein the front brakes are referenced to the brake pressure communicated to the rear brakes.

Accordingly, the invention comprises: a braking system, including: a master cylinder; rear brakes communicated to the master cylinder; front brakes hydraulically isolated from the rear brakes. An isolation valve interposes the master cylinder and the front brakes and has a first operative state communicating the master cylinder to the front brakes and a second state isolating the master cylinder from the front brakes. The system additionally includes a pump for activating the isolation valve and for pressurizing the front brakes. A motor is employed to power the pump and control unit means are used to cause the front brake pressure to follow rear brake pressure. The control unit means is responsive to a first pressure signal indicative of rear brake pressure and a second pressure signal indicative of the front brake pressure. The control unit comprises electric proportioning means for generating a commanded front brake pressure signal ($P_C$), comparison means for comparing the command brake pressure signal to the actual brake pressure signal and for generating an error signal ($P_E$); motor control means responsive to a positive error signal for activating the motor and for powering the pump (42). The system further includes means for normalizing the operating of the front and rear brakes and more specifically includes means for time delaying the operating of the rear brakes. This is accomplished by including in the rear brake line a flow restriction or orifice in parallel with a check valve. In an alternate embodiment of the invention an electrically operated isolation valve and a dump or relief valve is used.

Many other objects and purposes of the invention will be clear from the following detailed description of the drawings.

BRIEF DESCRIPTION OF THE DRAWINGS

In the drawings:

FIG. 1 illustrates the preferred embodiment of the present invention.

FIG. 2 illustrates a controller usable in the present invention.

FIG. 3 illustrates front and rear brake pressure profiles.

DETAILED DESCRIPTION OF THE DRAWINGS

Reference is made to FIG. 1 which illustrates the preferred embodiment of a brake system 8 incorporating the present invention. There is shown a hydraulic master cylinder generally shown as 10. The master cylinder communicates to wheels cylinders of respective sets of rear brakes 12a and 12b and front brakes 14a and 14b. A pressure responsive isolation valve 16 is placed in circuit with one chamber 10a of the master cylinder 10 and located upstream of the front brakes. It should be appreciated that an electrically operated isolation valve 16' can be substituted. This valve 16' and its associated electronics are shown in phantom line in FIG. 2. Inserted between another chamber 10b of the master cylinder 10 and the rear drum brakes 12a and 12b is a check valve 20 to allow for rapid decay of the rear brake pressure. A flow restriction such as orifice 22 is inserted in parallel across the check valve 20 to reduce the pressure rise time in the rear brakes. A first pressure sensor 30 senses the rear brake line 32 or master cylinder 10b pressure at a location upstream of the check valve 20. The output of the pressure sensor 30 is a signal representative of the pressure within the rear brake line 32 which is communicated to an electronic controller 40 (also see FIG. 2). Another pressure sensor 34 is communicated with the front brake line 36 downstream of the isolation valve 16. The pressure signal, representative of front line brake pressure is also communicated to the controller 40. The output of the electronic controller 40 is a signal, on line 43, to activate a motor 44 which in turn powers a pump 42 which supplies brake fluid through a conduit 46 to the control port 48 of the pressure activated isolation valve 16 and to the normally closed inlet 17 of the isolation valve 16. Pump 42 obtains brake fluid from a sump shown as 54. A flow orifice 56 may be provided across the pump between the pump output and the sump which provides a flow path to drain the front brakes. If the flow rate through the orifice 56 is not sufficient, it can be replaced by an electrically operated dump valve 57. The valve 57 can also be placed in parallel with the orifice 56 as shown in FIG. 1.

The electric control unit 40 includes a power supply circuit 70 and a control circuit 72. The purpose of the power supply circuit is to apply battery or alternator supply voltage to the motor 44 and to various portions of the control circuit 72. Upon closure of the ignition switch 74 or alternatively application of the pedal 60, i.e., closure of a brake switch 76, a switching transistor 78 is enabled which activates a voltage supply switch 80 to communicate battery or alternator voltage to the motor 44 and to the control circuit. As will be seen from the description below, the brake system 8 is electrically powered and as such, the supply circuit further includes a timer delay circuit 90 which maintains supply voltage to the motor 44 and control circuit 72 for a predetermined time (0.5 to 5 seconds) after the brake pedal is released. This time delay avoids premature turning off of the motor due to bounce of the brake switch 76 and also prohibits the supply voltage from being abruptly turned on and off, thereby energizing the control circuit and motor 44, such as when the operator taps on the brake pedal when the vehicle is parked.

As shown, the rear brakes of the vehicle are hydraulic, but can also be electrically powered. Upon application of the brake pedal 60, the master cylinder 10 (10a, 10b) applies brake pressure to the rear and initially to the front brakes. A front brake pressure command signal $P_C$ (also see numeral 92 of FIG. 2) is obtained by measuring master cylinder 10b or rear brake line 32 pressure with transducer 30. The output of this transducer 30 is communicated to a proportioning circuit 94, the output of which forms the commanded front brake pressure signal. It should be appreciated that the circuit 94 functions as an electric proportioning device and replaces the conventionally used proportioning valve, which typically includes a nonlinear characteristic. This nonlinear characteristic can be approximated electronically by a look-up table, a piece-wise linear curve fit or other technique as is known in the art. A summing circuit 96 compares the commanded brake pressure signal with the pressure in the front brake line $P_A$ as sensed by the front brake pressure transducer 34 forming an error signal $P_E$ (also see numeral 98). The error signal is communicated to a sign sensitive dead-band circuit 100 of known construction including positive and negative dead-band regions 100a and 100b. The dead-band region in the circuit 100 (100a) is used to minimize noise propogation throughout the control circuit 72. As shown schematically, if the commanded brake pressure signal $P_C$ is greater than the brake pressure $P_A$, a positive error signal is generated, shown by block 100a, which is communicated to a motor controller 102, the output of which is received by a constant frequency variable pulse width modulator 104. The controller 102 can be a proportional, integral, differential controller or other similar device. The output of the modulator 104 is fed to a conventional arrangement of motor power transistors QA and QB. These power transistors QA and QB are of the sense-fet variety which include a current monitoring lead which is connected to a motor current limiting circuit 110 of known variety. The output of the pulse width modulator 104 represents the command input to the motor 44. This output signal comprises a plurality of pulses having a constant frequency such as 25 KHz and a varying pulse width proportional to the error signal $P_E$. If for some reason, such as during motor start up, the binding of the pump 42, hydraulic load, etc., the current in the motor, as sensed by the motor current limiting circuit 110, exceeds a preset value, the output of the motor current limiting circuit 110 clamps the output of the pulse width modulator 104 to ground, thereby reducing the effective motor commanded signal, i.e., pulse width to the motor. This technique is one known in the art and not described in detail herein. It should be appreciated that during the first phase of braking, the pump 42 operates in its normal pumping mode moving fluid to the front brake cylinders. After the brake pressure achieves its commanded value, the pump operates somewhat as a rotary solenoid, that is, with the brake line fully pressurized only a modest rotation of the pump 42 contributes to additional braking force. During this phase of operation it is expected that pump rotation will be proportional to commanded motor current. As can be appreciated, in some regard the motor/pump combination operates as an electric master cylinder. As an example, a conventional hydraulic master cylinder pumps a relatively large amount of fluid to initiate braking. After the brake line has been pressurized, relatively small displacements in the master cylinder contribute directly to increased brake forces. It should be appreciated that the mode of operation of the pump 42 will depend upon the size of the orifice 56. In order to pressurize the front brakes the pump 42 must move enough fluid to overcome the leak rate through the orifice 56. If the leak rate is large, then the pump 42 will operate more often to pressurize the front brakes. The size of orifice 56 is chosen so that with the pump 56 on, maximum pressure can be built up in the front brakes.

If the system 8 includes the optional dump valve 57, the following circuitry would be included in the control circuit 72. Supply voltage is also communicated from the supply circuit 70 to the coil 112 of the dump valve 57. A Zener diode 14 and diode 116 are connected across the coil 112 in a conventional manner to speed up the current decay in the coil on turn-off. Absent a signal supplied to the solenoid drive transistor 116, the valve 57 will remain in a closed condition as shown in FIGS. 1 or 2. If during the operation of the system 8, the front brake pressure achieves a value greater than the commanded brake pressure, the error signal $P_E$ is negative. This negative error signal $P_E$ is communicated using the negative going portion of the dead-band circuit 100 (100b) to a second proportional integral, differential controller 120 which is communicated to another constant frequency variable pulse width modulator 122 which varies the on time of the solenoid drive transistor 116 so that this on time is proportional to the magnitude of the error signal. The frequency of the pulse width modulator 122 should be compatible with the valve 16'. A constant frequency of 100 cycles has been chosen for the second pulse width modulator 122. With the dump valve 57 open, fluid pressure in the front brakes can be more rapidly relieved to permit regulation thereof.

The operation of the system 8 is as follows. Upon application of the brake pedal 60 rear brake pressure will increase rather instantaneously. The output of the electric proportioning control circuit 94 defines the commanded front axle brake pressure signal in proportion to the actual rear brake pressure. Typically a 40:60 proportioning split between the rear and front brakes is acceptable.

Upon the initial application of the brake pedal, a large magnitude positive error signal $P_E$ is generated causing the controller 102 and modulator 104 to cause transistors QA and QB to turn on during the duration of each positive pulse generated by the modulator 78. With the power transistors QA and QB turned on, the motor 44 causes pump 42 to supply pressurized brake fluid from the reservoir 54 to the pressure operated isolation valve 16 causing same to change state and pressurizing the front brakes 14a and 14b. If the system 8 includes an electrically operated isolation valve such as 16' (shown by phantom line in FIG. 2), the error signal may also be used to activate this valve 16'. It should be appreciated that if valve 16' is used then the pressure activated isolation valve 16 is eliminated. The control circuit 72 will attempt to match the actual front brake pressure $P_A$ with the commanded front brake pressure $P_C$. During the regulation of the front brake pressure, the actual rear brake pressure may exceed the commanded brake pressure. In this situation the now negative going error signal $P_E$ is communicated to the controller 102. If the system does not include the dump valve 57, the motor control signal is temporarily commanded to zero wherein excess front brake pressure is decreased by permitting brake fluid to drain to the sump 54 through the orifice 56. Alternatively, if the system 8 includes the electrically operated dump valve 57 the negative going error signal (see 100b) is applied to the second controller 120 and pulse width modulator 122 to activate the solenoid drive transistor 116, thereby activating coil 112 and causing the electric dump valve 57 to change state and communicate the front brakes 14a and 14b to the sump or reservoir, thereby further decreasing front brake pressure.

As mentioned above, the application of brake pressure to the rear brakes 12a and 12b is virtually immediate. There will, however, exist a modest time delay during which the front brake will become activated. Proper brake design would prefer that the front and rear brakes be activated simultaneously or that the rear brakes be slightly delayed relative to the activation of the front brakes.

Since the application of the front brakes in the present invention will most always lag the application of the rear brake and since the front brakes are pressure referenced to the rear brakes, it is desirable to compensate for this delay. This is achieved by the use of the orifice 22. The orifice 22 momentarily delays pressure build within the rear brakes 12a and 12b due to its flow restriction.

Upon release of the brake pedal 60 brake fluid within the rear brakes 12a and 12b is permitted to flow into the master cylinder chamber 12a through the check valve 12b. Also upon release of the brake pedal and reduction of the rear brake pressure 32, the electronic controller 40 will terminate motor operation thereby reducing the activation pressure to the pressure activated isolation valve 16 causing same to move to its normal flow condition as shown in FIG. 1. (In the case of the electrically operated isolation valve 16' the removal of its activation signal causes it to change state). With the pressure activated isolation valve in this condition, brake fluid within the front brakes 14a and 14b is permitted to flow to the sump 54 through the restriction 56 and/or dump valve 57.

Many changes and modifications in the above described embodiment of the invention can, of course, be carried out without departing from the scope thereof. Accordingly, that scope is intended to be limited only by the scope of the appended claims.

We claim:

1. A braking system comprising:
   a master cylinder (10);
   rear brakes (12a,b) communicated to the master cylinder (10);
   front brakes (14a,b) hydraulically isolated from the rear brakes;
   isolation valve means (16; 16')interposing the master cylinder 10 and the front brakes (14a,b) having a first state communicating the master cylinder to the front brakes and a second state isolating the master cylinder from the front brakes and connecting a pump (42) to the front brakes;
   a motor (44) for powering the pump (42) in response to a control signal;
   a reservoir (54) communicated to an inlet of the pump (42);
   control unit means (40) for monitoring rear brake pressure and for generating the control signal, responsive to rear brake pressure, activating the motor thereby causing the pump to generate pressure in the front brakes proportional to rear brake pressure,
   a first pressure sensor (30) for generating a signal indicative of rear brake pressure;
   electric proportioning means (94) for generating a commanded front brake pressure signal ($P_C$);
   a second pressure sensor (32) for generating a signal indicative of rear brake pressure;
   comparison means (96) for comparing the command brake pressure signal to the actual brake pressure signal and for generating an error signal ($P_E$);
   motor control means (102, 104, 110, 120, 122, QA, QB) responsive to the error signal for generating the control signal and for activating the motor and for powering the pump (42).

2. The system as defined in claim 1 wherein the isolation valve means (16;16') includes a pressure operated isolation valve (16) responsive to pressure applied by the pump (42), such pressure causing the pressure operated isolation valve to change to its second state.

3. The system as defined in claim 1 wherein the isolation valve means includes an electrically operated isolation valve (16') interposing the master cylinder (10) and the front brakes (14a,b) and responsive to an error signal, for causing such isolation valve to operate in its second state.

4. The system as defined in claim 1 wherein a first orifice (56) is connected across the pump (42) to a reservoir (54).

5. The system as defined in claim 4 wherein an electrically operated dump valve (57) is connected across the pump (42) to the sump (54) and responsive to a control signal for relieving front brake pressure.

6. The system as defined in claim 1 including first means for delaying the operating of the rear brakes (12a,b) until at least a time when the front brakes become activated.

7. The system as defined in claim 6 wherein the first means includes a check valve means (20) in circuit between the master cylinder (10) and the rear brakes for permitting an unrestricted decay of rear brake pressure and a second orifice (22) in parallel with the check valve means.

8. In a braking system (8) having rear brakes (12a,b) communicated to a master cylinder (10) and front brakes (14a,b) hydraulically isolated from the rear brakes; the improvement comprising:
   isolation valve means (16; 16') interposing a master cylinder (10) and the front brakes (14a,b) having a first state communicating the master cylinder to the front brakes and a second state isolating the master cylinder from the front brakes and connecting a pump (42) to the front brakes;
   a motor (44) for powering the pump (42) in response to a control signal;
   a reservoir (54) communicated to an inlet of the pump (42);
   control unit means (40) for monitoring rear brake pressure and for generating the control signal, responsive to rear brake pressure, activating the motor thereby causing the pump to generating pressure in the front brakes proportional to rear brake pressure, a first pressure sensor (30) for generating a signal indicative of rear brake pressure;
   electric proportioning means (94) for generating a commanded front rake pressure signal ($P_C$);
   a second pressure sensor (32) for generating a signal of actual front brake pressure ($P_A$);
   comparison means (96) for comparing the command brake pressure signal to the actual brake pressure signal and for generating an error signal ($P_E$);
   motor control means (102, 104, 110, 120, 122, QA, QB), responsive to the error signal for generating the control signal and for activating the motor and for powering the pump (42).

9. The system as defined in claim 8 wherein the isolation valve means (16; 16') includes a pressure operated isolation valve (16') interposing the master cylinder (10) and the front brakes (14a,b) and responsive to an error signal, for causing the isolation valve to operate in its second state.

10. The system as defined in claim 8 wherein the isolation valve means (16; 16') includes an electrically operated isolation valve (16') interposing the master cylinder (10) and the front brakes (14a,b) and responsive to an error signal, for causing the isolation valve to operate in its second state.

11. The system as defined in claim 8 wherein a first orifice (56) is connected across the pump (42) to the reservoir (54).

12. The system as defined in claim 11 wherein an electrically operated dump valve (57) is connected across the pump (42) to the sump (54) and responsive to a control signal for relieving front brake pressure.

13. The system as defined in claim 8 including first means for delaying the operating of the rear brakes (12a,b) until at least a time when the front brakes become activated.

14. The system as defined in claim 13 wherein the first means includes a check valve means (20) in circuit between the master cylinder (10) and the rear brakes for permitting an unrestricted decay of rear brake pressure and a second orifice (22) in parallel with the check valve means.

* * * * *